(12) United States Patent
Zanoni et al.

(10) Patent No.: US 8,478,124 B1
(45) Date of Patent: Jul. 2, 2013

(54) OPTICAL IMA ARCHITECTURE

(75) Inventors: Raymond Zanoni, Columbia, MD (US); Peter J. Morgan, Glenelg, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1331 days.

(21) Appl. No.: 12/283,055

(22) Filed: Sep. 9, 2008

(51) Int. Cl.
*H04J 14/00* (2006.01)

(52) U.S. Cl.
USPC .......................................................... 398/68

(58) Field of Classification Search
USPC ................. 398/17, 66–73, 14, 63, 64
See application file for complete search history.

(56) References Cited

U.S. PATENT DOCUMENTS

| | | | | |
|---|---|---|---|---|
| 7,684,705 | B2 * | 3/2010 | Bouda | 398/72 |
| 7,826,745 | B2 * | 11/2010 | DeCusatis et al. | 398/75 |
| 2007/0092255 | A1 * | 4/2007 | Bouda | 398/72 |
| 2007/0291777 | A1 * | 12/2007 | Jamieson et al. | 370/401 |
| 2009/0129773 | A1 * | 5/2009 | Oron | 398/10 |
| 2009/0162063 | A1 * | 6/2009 | Mizutani et al. | 398/58 |

* cited by examiner

*Primary Examiner* — Jessica Stultz
*Assistant Examiner* — Tuan Nguyen
(74) *Attorney, Agent, or Firm* — Donna P. Suchy; Daniel M. Barbieri

(57) ABSTRACT

The present invention is a device including a wavelength division multiplexer for multiplexing a plurality of optical carrier signals on an optical fiber. A mission processor, including an optical line terminal (OLT) is communicatively coupled to a wavelength division multiplexor branch unit via an optical fiber for generating a plurality of fiber optic branches. A plurality of fiber optic branches communicatively coupled with the wavelength division multiplexor branch unit for communicating one or more signals to at least one optical network unit, wherein the mission processor transmits a first signal having at least one downstream wavelength to the wavelength division multiplexor branch unit, and wherein the plurality of fiber optic branches are configured for transmitting a branch signals having a plurality of wavelengths.

27 Claims, 8 Drawing Sheets

US 8,478,124 B1

OPTICAL IMA ARCHITECTURE

FIELD OF THE INVENTION

The present invention relates generally to passive optical networks. More specifically, the present invention relates to wavelength division multiplexing of passive optical networks.

BACKGROUND OF THE INVENTION

A passive optical network (PON) is a point-to-multipoint network architecture in which unpowered optical splitters are used to enable a single optical fiber to serve multiple optical network units (ONU). Downstream signals are broadcast to each ONU sharing a fiber or signal. Passive optical networks (PON) are limited in the number of optical network units serviced due to splitter losses of the unpowered optical splitters. Passive optical networks (PON) are also limited in the distance a signal is transmitted due to signal degradation. Several suggestions for improved communication have been suggested but with limited success.

Therefore, a device, system and method for improving communication using a passive optical network are needed.

SUMMARY OF THE INVENTION

In one illustrative embodiment, a device for improving passive optical network communication is discussed. The device includes a wavelength division multiplexor for multiplexing a plurality of optical carrier signals on an optical fiber. The device further includes a mission processor, including an optical line terminal (OLT) communicatively coupled to a wavelength division multiplexor branch unit via an optical fiber for generating a plurality of fiber optic branches. Additionally, the device includes a plurality of fiber optic branches communicatively coupled with the wavelength division multiplexor branch unit for communicating one or more signals to at least one optical network unit. The mission processor transmits a first signal having at least one downstream wavelength to the wavelength division multiplexor branch unit, and wherein the plurality of fiber optic branches are configured for transmitting a branch signals having a plurality of wavelengths.

In another embodiment, a method for improving passive optical network communication is discussed. The method includes multiplexing a plurality of optical carrier signals on an optical fiber via a wavelength division multiplexor. The method further includes communicating with the wavelength division multiplexor branch unit via a fiber optical signal. A further step includes transmitting the plurality of optical carrier signals to the wavelength division multiplexer branch unit via a optical fiber. An additional step includes generating a plurality of fiber optic branches via the wavelength division multiplexor branch unit for communicating a signal to at least one optical network unit. Still an additional step includes transmitting a first signal having at least one downstream wavelength to the wavelength division multiplexor branch unit. The method further includes transmitting at least one fiber optic branch signal to the at least one optical network unit.

In still another embodiment, a system for improving passive optical network communication is discussed. The system includes a wavelength division multiplexor for multiplexing a plurality of optical carrier signals on an optical fiber. The system further includes a mission processor, including an optical line terminal (OLT) communicatively coupled to a wavelength division multiplexor branch unit via an optical fiber for generating a plurality of fiber optic branches. The mission processor transmits a first signal having at least one downstream wavelength to the wavelength division multiplexor branch unit, and wherein the plurality of fiber optic branches are configured for transmitting a branch signals having a plurality of wavelengths. The system further includes an at least one optical network unit configured for receiving the plurality of fiber optic branches. The system further includes a plurality of fiber optic branches communicatively coupled with the wavelength division multiplexor branch unit for communicating one or more signals to the at least one optical network unit.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Figure 1:
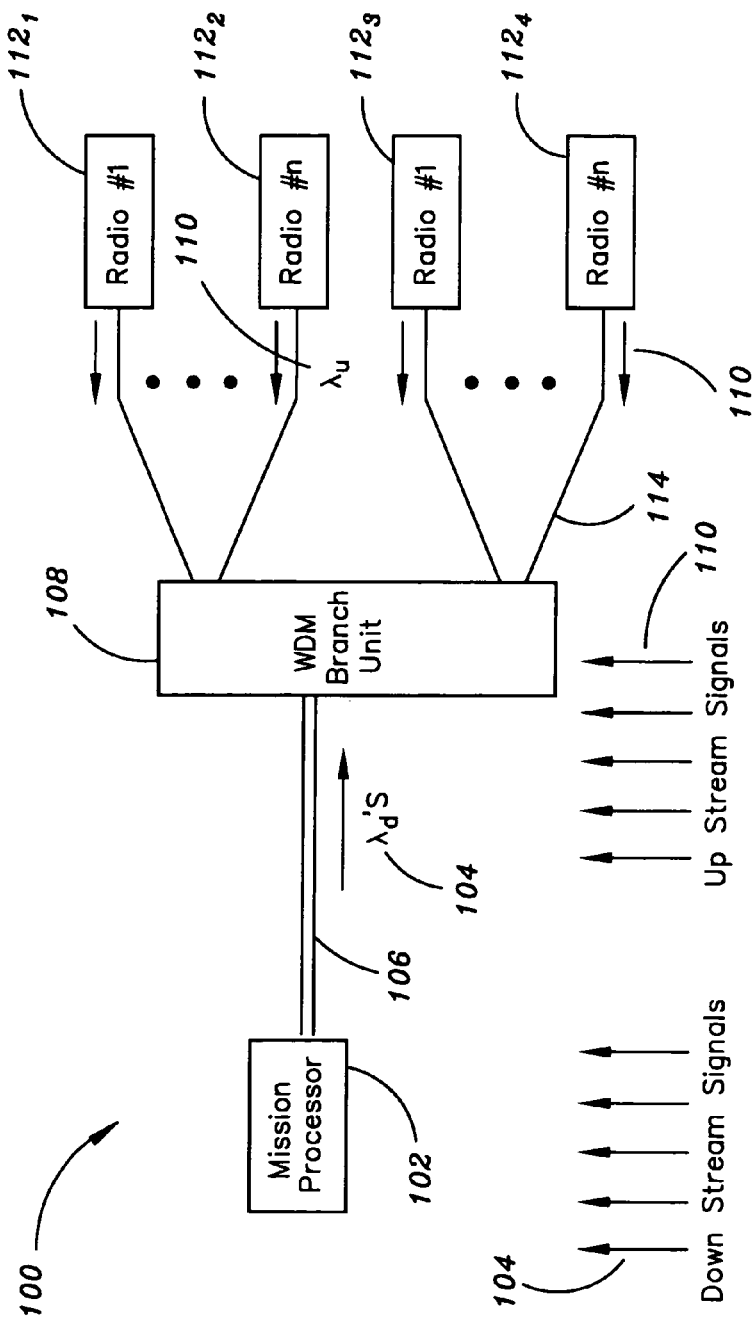
FIG. 1 is a block diagram of a passive optical network with a wavelength division multiplexer branch unit according to an exemplary embodiment of the present invention.
Figure 2:
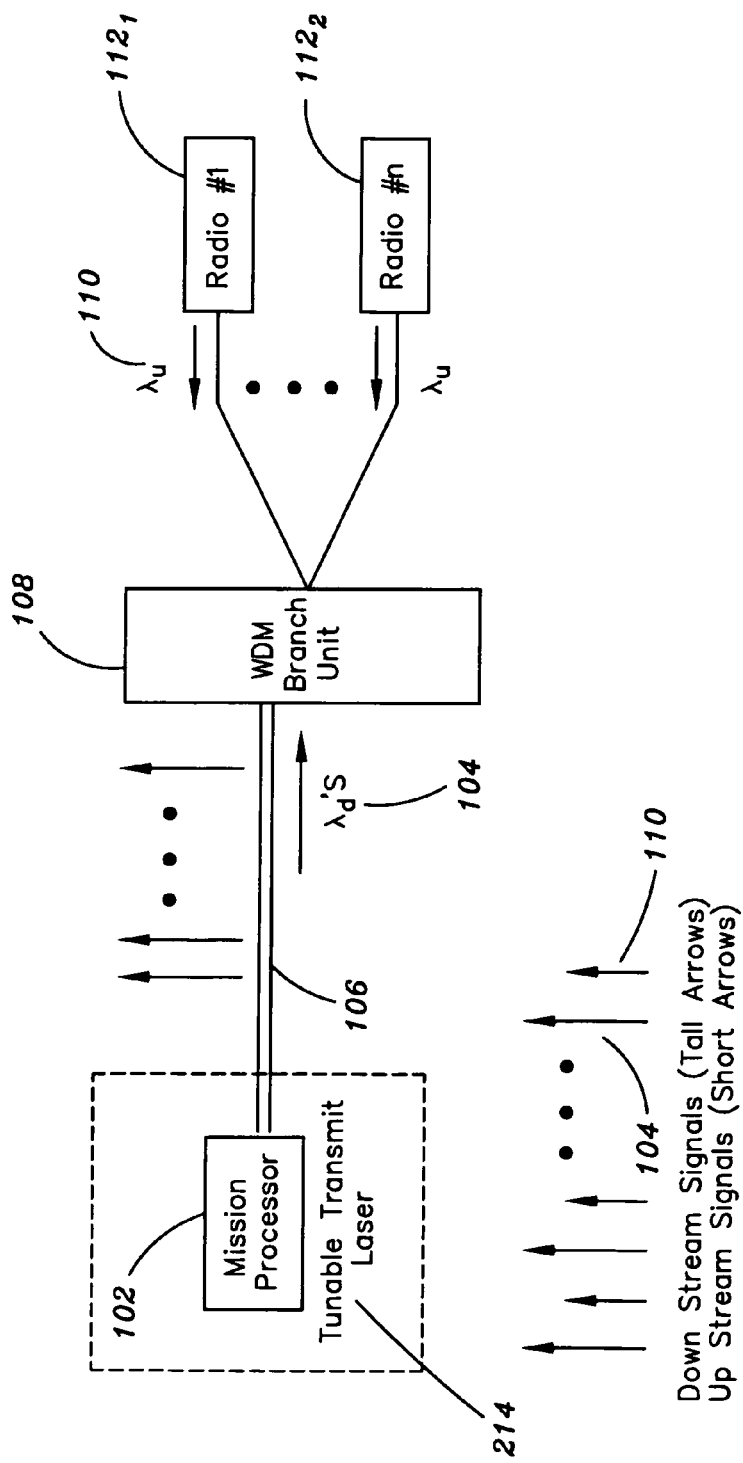
FIG. 2 is a block diagram of a passive optical network with a wavelength division multiplexer branch unit and a tunable transmit laser according to an exemplary embodiment of the present invention.
Figure 3:
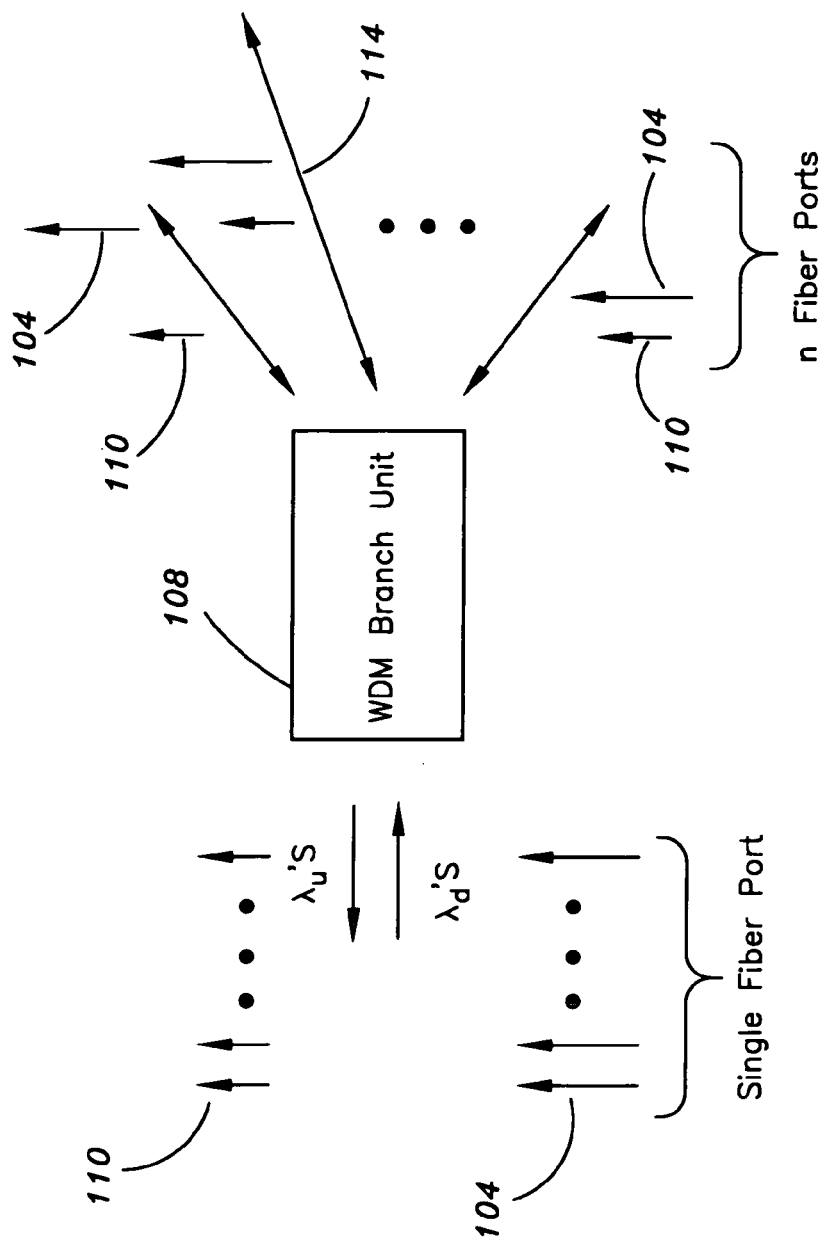
FIG. 3 is a is a block diagram of wavelength division multiplexer branch unit function according to an exemplary embodiment of the present invention.
Figure 4:
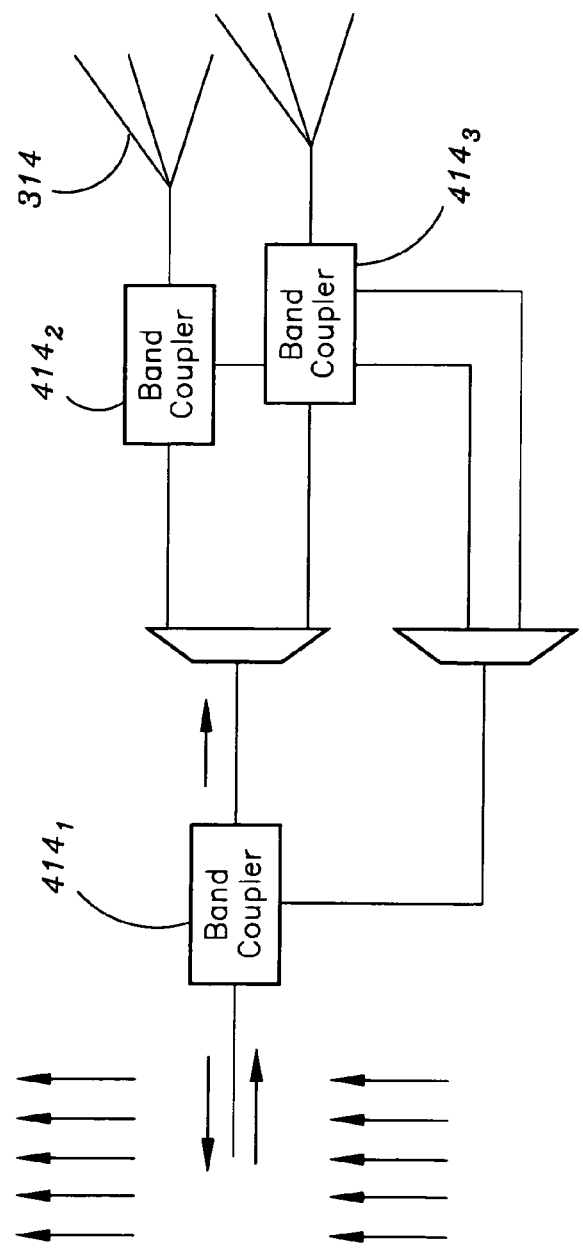
FIG. 4 is a is a block diagram of wavelength division multiplexer branch unit detailing a plurality of band couplers according to an exemplary embodiment of the present invention.
Figure 5:
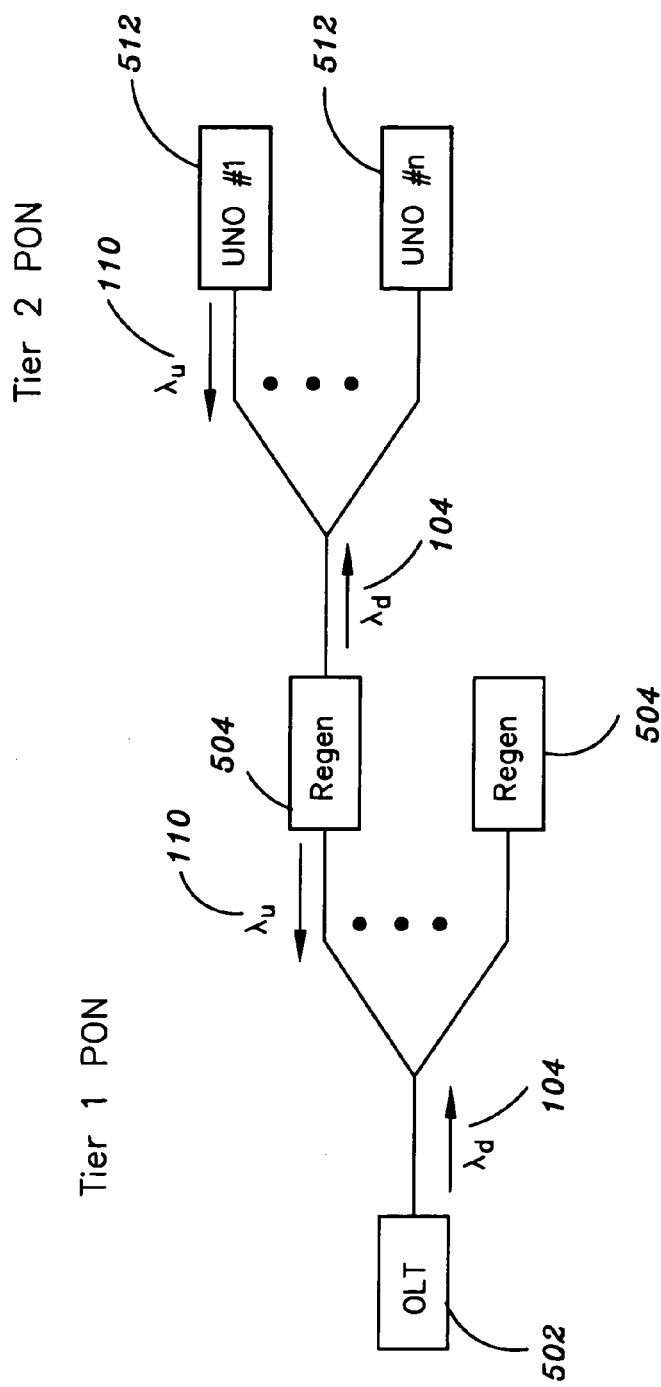
FIG. 5 is a block diagram illustrating a two tier passive optical network with regeneration according to an exemplary embodiment of the present invention.
Figure 6:
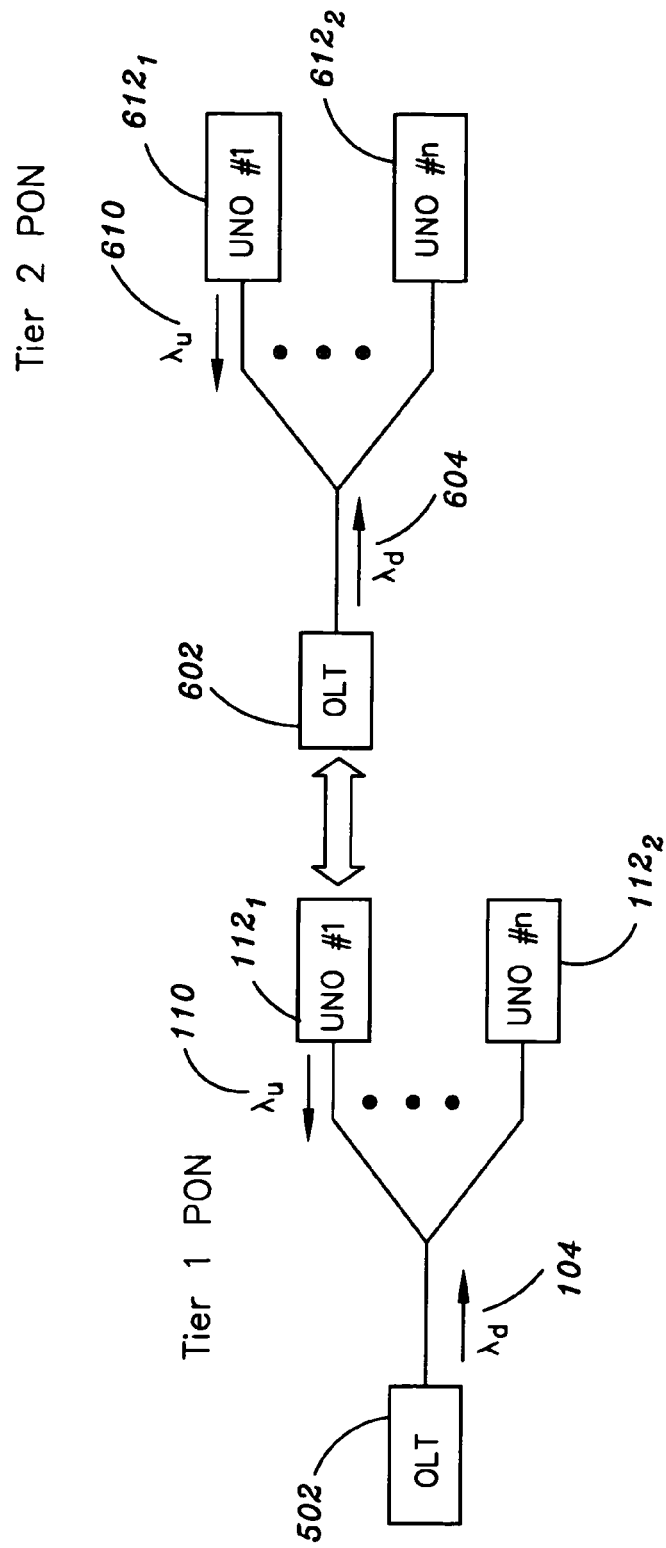
FIG. 6 is a block diagram illustrating a two tier passive optical network using a second optical line transmitter according to an exemplary embodiment of the present invention.
Figure 7:
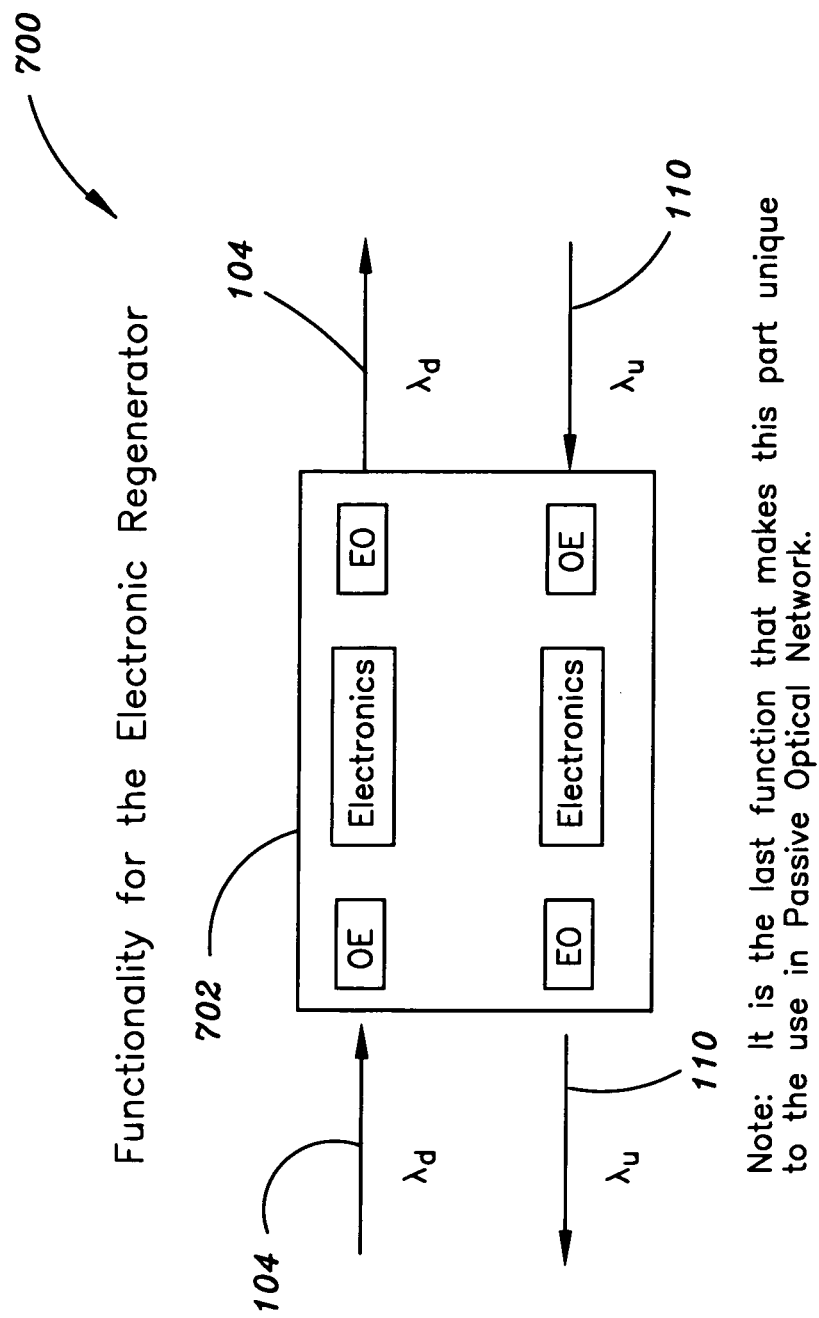
FIG. 7 is a block diagram illustrating an optical/electrical/optical converter of a regeneration unit according to an exemplary embodiment of the present invention.

Reference will now be made in detail to presently preferred embodiments of the invention, examples of which are illustrated in the accompanying drawings.

Passive Optical Network architectures (e.g. Fiber to the Home) are tree topologies. Due to the optical splitter losses, expanding the number of remote sites beyond 2^5 or 2^6 is difficult. In order to expand much beyond 2^6 it is necessary to overcome the losses by amplification.

Referring generally to FIGS. 1-7, a wavelength division multiplexing device for a passive optical network in accordance with an exemplary embodiment of the present invention is shown. In a current embodiment of the present invention, the passive optical network device 100 may include a wavelength division multiplexor (not shown) configured for multiplexing a plurality of optical carrier signals on an optical fiber. Further, the passive optical network device may include a mission processor 102. The mission processor 102 may include an optical line terminal (OLT) (not shown). The optical line transmitter may be communicatively coupled to a wavelength division multiplexor branch unit 108. For example, this communicative coupling may be via an optical fiber 106. The wavelength division multiplexor branch unit (branch unit) 108 is configured for generating a plurality of fiber optic branches 114. For example, the branch unit 108 receives an optical signal and duplicates the signal according to predefined parameters.

In a further embodiment of the present invention, a plurality of fiber optic branches 314 may be communicatively coupled with the wavelength division multiplexor branch unit 108 for communicating one or more signals to at least one optical network unit 112. For example, the optical network unit 112 may include radios, entertainment systems, navigation systems or other avionics applications.

In a further embodiment, the mission processor 102 transmits a first signal having at least one downstream wavelength 104 to the wavelength division multiplexor branch unit 108, and wherein the plurality of fiber optic branches 314 are configured for transmitting the branch signals having a plurality of wavelengths.

The wavelength division multiplexor branch unit 108 may include at least one independent port. For example, the at least one independent port is configured for receiving and transmitting a signal including an at least one downstream wavelength 104 and an at least one upstream wavelength 110. For example, one wavelength is used for the downstream traffic and another wavelength is used for the upstream traffic. The one downstream wavelength 104 is related to the at least one upstream wavelengths 110 by the formula: $_i = \lambda_{ud} + \Delta\lambda$ and a pass band for the at least one independent port is greater than $\Delta\lambda$. Additionally, the wavelength division multiplexor branch unit 108 includes a plurality of band couplers 414.

In a further embodiment, the mission processor 102 may include a tunable transmit laser for providing switching between applications. A tunable transmit laser 214 provides a means to independently address avionics applications. For example, the tunable laser 214 can provide switching between various avionics applications in less than 200 ns.

A further embodiment may include a second optical line transmitter 602 communicatively coupled to an at least one optical network unit 112 for creating a concatenated passive optical network. This addition of a second optical line transmitter 602 provides for a two tier passive optical network. For example, where the optical network unit 112 of the first tier transmits or relays a signal for retransmitting to more remote optical network units 512 via the second optical transmitter 602.

In a concatenated passive optical network the interconnection between the two passive optical networks may be interconnected via a router (not shown) installed between the tier one optical network unit 112 and a tier two optical line transmitter 602. In a further aspect, an optical amplifier (not shown) may be used to replace both the tier one optical network unit 112 and a tier two optical line transmitter 602. In yet another aspect, an electronic regeneration unit 700 may be used to manage the concatenation of the two passive optical networks.

The electronic regeneration unit 700 may include an electronic to optical/optical to electronic converter. This electronic regeneration unit 700 may be configured for connecting a tier one passive optical network with a tier two passive optical network for servicing remote applications. The electronic regeneration unit 700 may be configured to detect at least one downstream wavelength 104 and transmit a regenerated downstream wavelength 704 via the second optical line transmitter 602 downstream. Additionally, the electronic regeneration unit 700 may be configured to detect a plurality of upstream wavelength and transmit a regenerated upstream wavelength 710 via the second optical line transmitter upstream 602.

In a further embodiment of the present invention, the electronic to optical converter (regeneration unit) 700 for the upstream wavelength 610 in a passive optical network may be configured to turn off when the optical to electronic for the upstream wavelength 610 fails to detect an amplified spontaneous emission (ASE).

Figure 8:
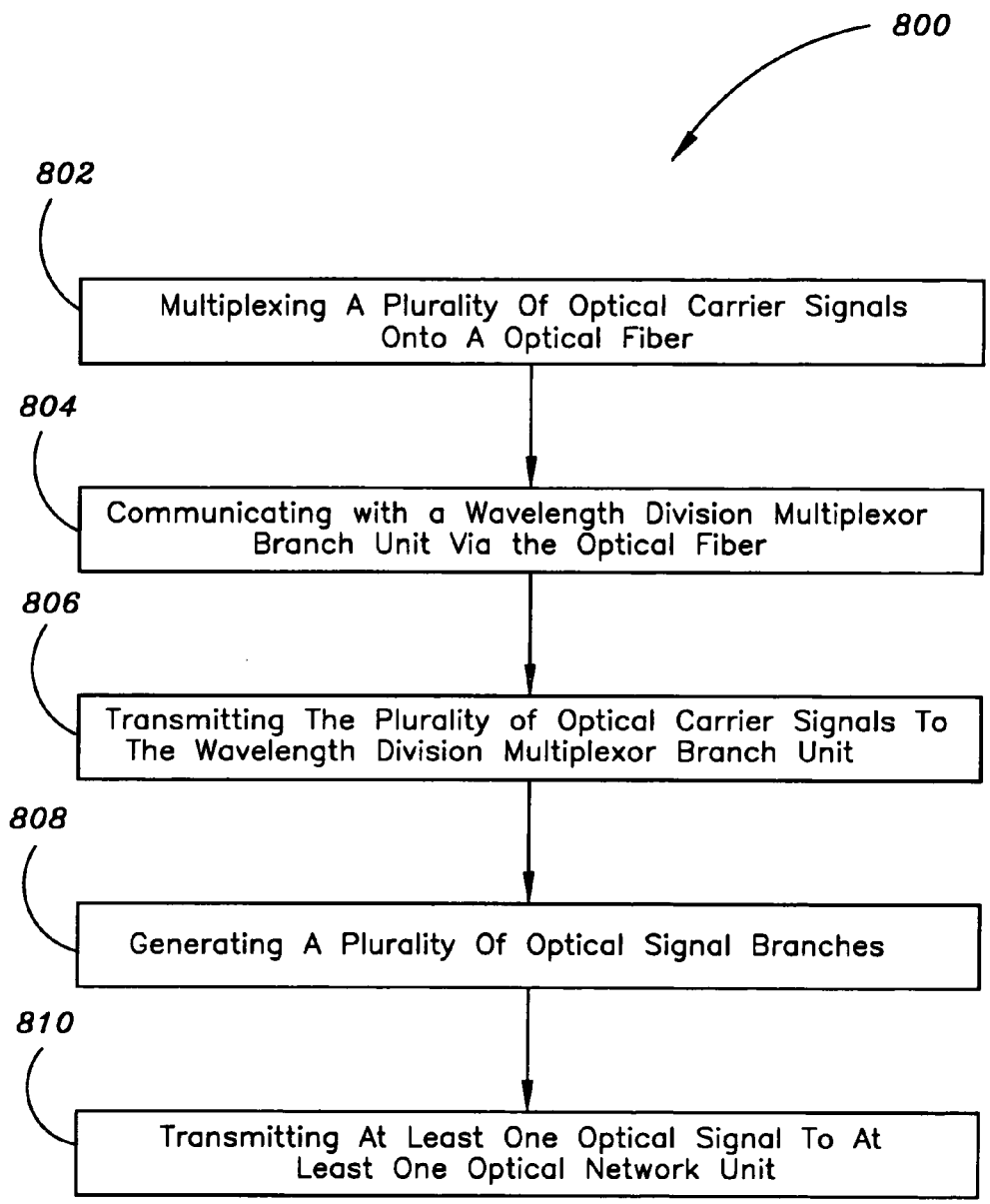
FIG. 8 is a methodology according to an exemplary embodiment of the present invention.

Referring specifically to FIG. 8. A further embodiment of the present invention a method 800 of implementing the present invention in accordance with the present invention is shown. The method 800 may include a step 802 of multiplexing a plurality of optical carrier signals on an optical fiber. For example, the plurality of data signals for transmission may be multiplexed for carriage on an optical fiber or laser transmission organized into different wavelengths of tight.

In a contemplated embodiment the method 800 may further include step 804 of communicating with the wavelength division multiplexor branch unit via a fiber optical signal. For example, the wavelength division multiplexor branch unit may be communicatively coupled with the optical laser transmitter of the mission processor 102 via an optical fiber.

In a further embodiment the method 800 may include step 806 of transmitting the plurality of optical carrier signals to the wavelength division multiplexer branch unit. The step 806 of transmitting the plurality of optical signals to the wavelength division multiplexor branch unit may be via an optical fiber.

In a further embodiment the method 800 may include a step 802 of multiplexing a plurality of optical carrier signals onto an optical fiber. For example, a plurality of optical carrier signals is combined into one signal over a shared medium.

In yet another embodiment, the method 800 may include the step 804 of communicating with a wavelength division multiplexor branch units via an optical fiber. Fore example, the wavelength division multiplexor branch unit may be communicatively coupled to a mission processor via a optical fiber. The optical fiber may be configured for providing a communicative link to the wavelength division multiplexor branch unit.

In yet another embodiment, the method 800 may include the step 806 of transmitting the plurality of optical carrier signals to the wavelength division multiplexor branch unit. For example, the mission processor combines a plurality of optical carrier signals onto an optical fiber whereby the plurality of optical carrier signals are transmitted to the wavelength division multiplexor branch unit on an optical fiber.

In a further embodiment of the present invention the method 800 may include step 808. Step 808 may be the step of generating a plurality of optical signal branches. For example, on the upstream pass the wavelength division multiplexor branch unit may be configured with an input port wherein a input signal is replicated via the wavelength division multiplexor branch unit and at least one output from the at least one output port reflects the entire input signal.

In a further embodiment of the present invention the method 800 may include step 810. Step 810 may include transmitting at least one optical signal branch to a at least one optical network unit. For example, the wavelength division multiplexor branch unit may be configured for transmitting via a plurality of output ports the plurality of optical signal branches. The plurality of optical signal branches follows the natural split of the fiber optic to provide between 32 to 64 separate signals with each separate signal being transmitted to the at least one optical network unit In a further embodiment of a present invention may include a system 100 for implementing the present invention. The system 100 may include a mission processor 102 for multiplexing a plurality of optical carrier signals on an optical fiber 106; a mission processor 102, including a optical line terminal (OLT) (not shown) communicatively coupled to a wavelength division multiplexor branch unit 108 via a optical fiber 106 for generating a plurality of fiber optic branches 114; a at least one optical network unit 112 configured for receiving the plurality of fiber optic branches 114; and a plurality of fiber optic branches 114 communicatively coupled with the wavelength division multiplexor branch unit 108 for communicating one or more signals to the at least one optical network unit 112.

The mission processor 102 transmits a first signal having at least one downstream wavelength 104 to the wavelength division multiplexor branch unit 108. The plurality of fiber optic branches 114 is configured for transmitting branch signals having a plurality of wavelengths.

The wavelength division multiplexor branch unit 108 may include at least one independent port, and wherein the at least one independent port is configured for receiving and transmitting a signal including a at least one downstream wavelength 104 and a at least one upstream wavelength 110, wherein the difference between the at least one downstream wavelength 104 is related to the at least one upstream wavelength 110 by $\lambda_{di}=\lambda_{ui}+\Delta\lambda$ and a pass band for the at least one independent port is greater than $\Delta\lambda$. The wavelength division multiplexor branch unit 108 may include a plurality of band couplers 414.

In a further embodiment of the present invention the mission processor 102 may include a tunable transmit laser 214 for providing switching between applications.

In yet a further embodiment, the system may include a second optical line transmitter 602 communicatively coupled to an at least one optical network unit 112 for creating a concatenated passive optical network comprising a tier one passive optical network and a second tier passive optical network. The second optical line transmitter 602 may be communicatively coupled to an optical network unit 112 via a router installed between the tier one optical network unit and a tier two optical line transmitter.

In a further embodiment, the system may include an electronic regeneration unit 702, the electronic regeneration unit 702 having an electronic to optical/optical to electronic converter configured for connecting a tier one passive optical network with a tier two passive optical network for servicing remote applications. The electronic regeneration unit 702 may be configured to detect a downstream wavelength 104 and transmit a regenerated downstream wavelength 604 via the second optical line transmitter 602 downstream. The electronic regeneration unit 702 is configured to detect a plurality of upstream wavelength 110 and transmit a regenerated upstream wavelength 610 via the second optical line transmitter 602 upstream. Where the electronic to optical converter for the upstream wavelength 610 may be configured to turn off when the optical to electronic for the upstream wavelength 610 fails to detect an amplified spontaneous emission (ASE).

Systems and apparatuses in accordance with various aspects of the present invention provide an improved optical IMA architecture. In this regard, the present invention may be described herein in terms of functional block components and various processing steps. It should be appreciated that such functional blocks may be realized by any number of hardware, firmware, and/or software components configured to perform the specified functions. For example, the present invention may employ various integrated circuit components, e.g., memory elements, digital signal processing elements, look-up tables, and the like, which may carry out a variety of functions under the control of one or more microprocessors or other control devices. Such general techniques and components that are known to those skilled in the art are not described in detail herein.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

The invention claimed is:

1. A system, comprising:
a mission processor, the mission processor including an optical line terminal (OLT);
a wavelength division multiplexor branch unit in communication with the OLT, the wavelength division multiplexor branch unit configured for receiving a wavelength division multiplexed signal from the mission processor, the wavelength division multiplexor branch unit further configured for generating at least one branch signal based on the wavelength division multiplexed signal received; and
at least one optical network unit in communication with the wavelength division multiplexor branch unit, the at least one optical network unit configured for receiving the at least one branch signal from the wavelength division multiplexor branch unit, the at least one optical network unit further configured for providing the at least one branch signal to a second tier passive optical network in communication with the at least one optical network unit.

2. The system of claim 1, wherein the wavelength division multiplexor branch unit includes at least one independent port, and wherein the at least one independent port is configured for receiving and transmitting a signal including at least one downstream wavelength and at least one upstream wavelengths, wherein the difference between the at least one downstream wavelength is related to the at least one upstream wavelengths by $\lambda di=\lambda ui+\Delta\lambda$ and a pass band for the at least one independent port is greater than $\Delta\lambda$, wherein $\lambda di$ denotes the at least one downstream wavelength, $\lambda ui$ denotes the at least one upstream wavelength, and $\Delta\lambda$ denotes a wavelength offset between the at least one downstream wavelength and the at least one upstream wavelengths.

3. The system of claim 1, wherein the wavelength division multiplexor branch unit comprises a plurality of band couplers.

4. The system of claim 1, wherein the mission processor comprises a tunable transmit laser for providing switching between applications.

5. The system of claim 1, wherein the at least one optical network unit is in communication with the second tier passive optical network via a second optical line transmitter.

6. The system of claim 5, wherein the second optical line transmitter is communicatively coupled to the at least one optical network unit via a router installed between said optical network unit and the second optical line transmitter.

7. The system of claim 1, wherein the at least one optical network unit includes an electronic regeneration unit, the electronic regeneration unit having an electronic to optical/optical to electronic converter configured for communicating with the second tier passive optical network.

8. The system of claim 7, wherein the electronic regeneration unit is configured to detect a downstream wavelength and transmit a regenerated downstream wavelength.

9. The system of claim 7, wherein the electronic regeneration unit is configured to detect a plurality of upstream wavelength and transmit a regenerated upstream wavelength.

10. The system of claim 9, wherein the electronic to optical converter for the upstream wavelength is configured to turn off when the optical to electronic for the upstream wavelength fails to detect an amplified spontaneous emission (ASE).

11. A method comprising:
receiving a wavelength division multiplexed signal at a wavelength division multiplexor branch unit;
generating a plurality of branch signals based on the wavelength division multiplexed signal received; and
transmitting at least one branch signal to at least one optical network unit, wherein the at least one optical network unit is in communication with a second tier passive optical network.

12. A method as claimed in claim 11, wherein the wavelength division multiplexed signal includes a multiplexed signal of a plurality of optical carrier signals.

13. A method as claimed in claim 11, wherein the wavelength division multiplexor branch unit comprises a plurality of band couplers.

14. A method as claimed in claim 11, wherein the step of generating a plurality of branch signals based on the wavelength division multiplexed signal received includes:
receiving the wavelength division multiplexed signal as input to the wavelength division multiplexer branch unit and branching the optical signal at a predetermined ratio.

15. The method as claimed in claim 11, further comprising:
selecting a wavelength via a tunable transmit laser for selectively addressing selected applications.

16. The method as claimed in claim 11, wherein the at least one optical network unit is in communication with the second tier passive optical network via a second optical line transmitter.

17. The method as claimed in claim 16, wherein the second optical line transmitter is communicatively coupled to the at least one optical network unit via a router installed between said optical network unit and the second optical line transmitter.

18. A system, comprising:
a mission processor, the mission processor including an optical line terminal (OLT);
a wavelength division multiplexor branch unit in communication with the OLT, the wavelength division multiplexor branch unit configured for receiving a wavelength division multiplexed signal having at least one downstream wavelength from the mission processor, the wavelength division multiplexor branch unit further configured for generating at least one branch signal based on the wavelength division multiplexed signal received; and
a first optical network unit communicatively coupled to a first independent port of the wavelength division multiplexor branch unit; and
a second optical network unit communicatively coupled to a second independent port of the wavelength division multiplexor branch unit,
wherein the first independent port of the wavelength division multiplexor branch unit is configured for supporting a first pass band and the second independent port of the wavelength division multiplexor branch unit is configured for supporting a second pass band, allowing the mission processor to independently communicate with one of the first optical network unit or the second optical network unit.

19. The system of claim 18, wherein each of the first and second independent port of the wavelength division multiplexor branch unit is configured for receiving and transmitting a signal including a at least one downstream wavelength and a at least one upstream wavelengths, wherein the difference between the at least one downstream wavelength is related to the at least one upstream wavelengths by $\lambda di = \lambda ui + \Delta\lambda$ and a pass band for the at least one independent port is greater than $\Delta\lambda$, wherein $\lambda di$ denotes the at least one downstream wavelength, $\lambda ui$ denotes the at least one upstream wavelength, and $\Delta\lambda$ denotes a wavelength offset between the at least one downstream wavelength and the at least one upstream wavelengths.

20. The system of claim 18, wherein the wavelength division multiplexor branch unit comprises a plurality of band couplers.

21. The system of claim 18, wherein the mission processor comprises a tunable transmit laser for providing switching between communicating with the first optical network unit and communicating with the second optical network unit.

22. The system of claim 18, wherein at least one of the first optical network unit or the second optical network unit is in communication with a second tier passive optical network.

23. The system of claim 22, wherein the at least one of the first optical network unit or the second optical network unit is in communication with the second tier passive optical network via a second optical line transmitter.

24. The system of claim 22, wherein at least one of the first optical network unit or the second optical network unit includes an electronic regeneration unit, the electronic regeneration unit having an electronic to optical/optical to electronic converter configured for communicating with the second tier passive optical network.

25. The system of claim 24, wherein the electronic regeneration unit is configured to detect a downstream wavelength and transmit a regenerated downstream wavelength.

26. The system of claim 24, wherein the electronic regeneration unit is configured to detect a plurality of upstream wavelength and transmit a regenerated upstream wavelength.

27. The system of claim 26, wherein the electronic to optical converter for the upstream wavelength is configured to turn off when the optical to electronic for the upstream wavelength fails to detect an amplified spontaneous emission (ASE).

* * * * *